(12) United States Patent
Niemi

(10) Patent No.: US 9,544,498 B2
(45) Date of Patent: Jan. 10, 2017

(54) METHOD FOR FORMING IMAGES

(75) Inventor: Sami Niemi, Skanor (SE)

(73) Assignee: Mobile Imaging in Sweden AB, Lund (SE)

( * ) Notice: Subject to any disclaimer, the term of this patent is extended or adjusted under 35 U.S.C. 154(b) by 724 days.

(21) Appl. No.: 13/825,214

(22) PCT Filed: Sep. 20, 2011

(86) PCT No.: PCT/SE2011/051124
§ 371 (c)(1),
(2), (4) Date: Jun. 3, 2013

(87) PCT Pub. No.: WO2012/039669
PCT Pub. Date: Mar. 29, 2012

(65) Prior Publication Data
US 2014/0146131 A1    May 29, 2014

(30) Foreign Application Priority Data

Sep. 20, 2010 (SE) ...................................... 1050977

(51) Int. Cl.
*H04N 7/00* (2011.01)
*G06K 9/00* (2006.01)
(Continued)

(52) U.S. Cl.
CPC .......... *H04N 5/23238* (2013.01); *G03B 37/04* (2013.01); *G06T 3/4038* (2013.01);
(Continued)

(58) Field of Classification Search
CPC ............ H04N 5/23238; H04N 13/0221; H04N 13/0434; H04N 13/0431; G03B 37/04; G06T 3/4038
See application file for complete search history.

(56) References Cited

U.S. PATENT DOCUMENTS 5,689,611 A      11/1997  Ohta et al.
6,249,616 B1 *    6/2001  Hashimoto ........... G06T 7/0034
                                                345/427
(Continued)

FOREIGN PATENT DOCUMENTS

CN    1471375 A    1/2004
CN    1750593 A    3/2006
(Continued)

OTHER PUBLICATIONS

International Search Report for Application No. PCT/SE2011/051124, dated Mar. 12, 2012.
(Continued)

*Primary Examiner* — Dave Czekaj
*Assistant Examiner* — Tsion B Owens
(74) *Attorney, Agent, or Firm* — Alston & Bird LLP

(57) ABSTRACT

According to one aspect of the present inventive concept there is provided a method for forming images, comprising: providing a plurality of images, each image including a first image part and a second image part, and each image depicting a respective partial view, wherein there is an overlap between partial views depicted in pairs of consecutive images, forming a first combined image from said first image parts, which first combined image depicts a first continuous view, and forming a second combined image from said second image parts, which second combined image depicts a second continuous view, wherein the first and the second continuous views overlap.

22 Claims, 6 Drawing Sheets

(51) Int. Cl.
*H04N 5/232* (2006.01)
*G03B 37/04* (2006.01)
*H04N 13/00* (2006.01)
*H04N 13/02* (2006.01)
*G06T 3/40* (2006.01)
*H04N 13/04* (2006.01)

(52) U.S. Cl.
CPC ..... *H04N 13/0018* (2013.01); *H04N 13/0221* (2013.01); *H04N 13/0264* (2013.01); *H04N 13/0431* (2013.01); *H04N 13/0434* (2013.01); *H04N 13/0459* (2013.01)

(56) References Cited

U.S. PATENT DOCUMENTS

| | | | |
|---|---|---|---|
| 6,304,284 B1 | 10/2001 | Dunton et al. | |
| 6,930,703 B1 | 8/2005 | Hubel et al. | |
| 7,623,733 B2 | 11/2009 | Hirosawa | |
| 7,639,897 B2 | 12/2009 | Gennetten et al. | |
| 8,077,213 B2 | 12/2011 | Gulliksson | |
| 8,249,332 B2* | 8/2012 | Stevens | G06T 7/0075 382/154 |
| 2001/0010546 A1 | 8/2001 | Chen | |
| 2001/0048802 A1 | 12/2001 | Nakajima et al. | |
| 2002/0025796 A1 | 2/2002 | Taylor et al. | |
| 2004/0097206 A1 | 5/2004 | Grewing et al. | |
| 2004/0174434 A1 | 9/2004 | Walker et al. | |
| 2004/0189849 A1 | 9/2004 | Hofer | |
| 2004/0201755 A1 | 10/2004 | Norskog | |
| 2004/0218833 A1 | 11/2004 | Ejiri et al. | |
| 2004/0239767 A1 | 12/2004 | Stavely et al. | |
| 2005/0031214 A1 | 2/2005 | Zhang et al. | |
| 2005/0168594 A1 | 8/2005 | Larson et al. | |
| 2006/0050152 A1 | 3/2006 | Rai et al. | |
| 2006/0078224 A1 | 4/2006 | Hirosawa | |
| 2006/0181619 A1 | 8/2006 | Liow et al. | |
| 2006/0235765 A1 | 10/2006 | David | |
| 2007/0025723 A1 | 2/2007 | Baudisch et al. | |
| 2007/0030363 A1 | 2/2007 | Cheatle et al. | |
| 2007/0055651 A1 | 3/2007 | Yamanaka et al. | |
| 2007/0081081 A1 | 4/2007 | Cheng | |
| 2007/0097206 A1* | 5/2007 | Houvener | G03B 35/08 348/26 |
| 2007/0224980 A1 | 9/2007 | Wakefield | |
| 2007/0274705 A1 | 11/2007 | Kashiwa et al. | |
| 2008/0152258 A1 | 6/2008 | Tulkki | |
| 2009/0290759 A1 | 11/2009 | Stevens et al. | |
| 2010/0053353 A1* | 3/2010 | Hunter | H04N 5/23293 348/222.1 |
| 2011/0141227 A1* | 6/2011 | Bigioi | G06T 7/0075 348/36 |
| 2012/0105601 A1* | 5/2012 | Jeon | H04N 13/026 348/50 |
| 2013/0300822 A1 | 11/2013 | Mills | |

FOREIGN PATENT DOCUMENTS

| | | |
|---|---|---|
| EP | 1 309 171 A2 | 5/2003 |
| EP | 1613060 A1 | 1/2006 |
| JP | H11-88811 A | 3/1999 |
| TW | 401687 B | 8/2000 |
| WO | WO 99/51027 A1 | 10/1999 |
| WO | WO 03/105466 A1 | 12/2003 |
| WO | WO-2004/068865 A1 | 8/2004 |
| WO | WO 2005/036780 A1 | 4/2005 |
| WO | WO-2005/050567 A1 | 6/2005 |
| WO | WO 2005/112437 A1 | 11/2005 |
| WO | WO 2006/002796 A1 | 1/2006 |
| WO | WO-2010/072587 A1 | 7/2010 |

OTHER PUBLICATIONS

Peleg, S., et al., *Stereo Panorama with a Single Camera*, Proceedings of the 1999 IEEE Computer Society Conference on Computer Vision and Patter Recognition; Jun. 23-25, 1999; Fort Collins, Colorado, IEEE, vol. 1, pp. 395-401.

Shum, H. Y., et al.; "Rendering with Concentric Mosaics;" SIGGRAPH 99; pp. 299-206; dated 1999.

Baudisch, P. et al.; "Panoramic Viewfinder: Shooting Panoramic Pictures with the Help of a Real-Time Preview"; UIST '05 (Oct. 2005) pp. 1-2.

Baudisch, P., et al., Panoramic Viewfinder: Providing a Real-Time Preview to Help Users Avoid Flaws in Panoramic Pictures, Proceedings of Ozchi, 2005.

Communication and extended search report issued by the European Patent Office in corresponding European patent application No. 07748329.5, dated Mar. 25, 2011.

Communication issued by the European Patent Office in corresponding European patent application No. 07748329.5, dated Mar. 1, 2016.

Communication issued by the European Patent Office in corresponding European patent application No. 07748329.5, dated Mar. 26, 2012.

Extended European Search Report from corresponding European Patent Application No. 11827056.0 dated Apr. 11, 2014.

International Preliminary Report on Patentability from corresponding International Patent Application No. PCT/SE2007/000680 dated Nov. 18, 2008.

International Search Report for Application No. PCT/SE2007/000680 dated Oct. 30, 2007.

Notice of Allowance for U.S. Appl. No. 11/634,264, dated Dec. 2, 2010.

Notification of Reason for Rejection in Japanese Patent Application No. 2009520706 mailed Aug. 30, 2011 (7 pages).

Office Action for U.S. Appl. No. 11/634,264, dated Aug. 20, 2010.
Office Action for U.S. Appl. No. 11/634,264, dated Jan. 26, 2010.
Office Action for U.S. Appl. No. 11/634,264, dated Mar. 24, 2010.
Office Action for U.S. Appl. No. 11/634,264, dated May 22, 2009.
Office Action for U.S. Appl. No. 11/634,264, dated Sep. 4, 2009.
Office Action for U.S. Appl. No. 12/805,850, dated Apr. 8, 2011.
Office Action for U.S. Appl. No. 12/805,850, dated Oct. 12, 2011.
Office Action from corresponding Chinese Patent Application No. 201180052544.7 dated Jan. 29, 2015.

Written Opinion from corresponding International Patent Application No. PCT/SE2007/000680 dated Oct. 30, 2007.

Written Opinion from corresponding International Patent Application No. PCT/SE2011/051124 dated Mar. 12, 2012.

Office Action from corresponding Chinese Patent Application No. 201310132668.7 dated Sep. 5, 2016.

* cited by examiner

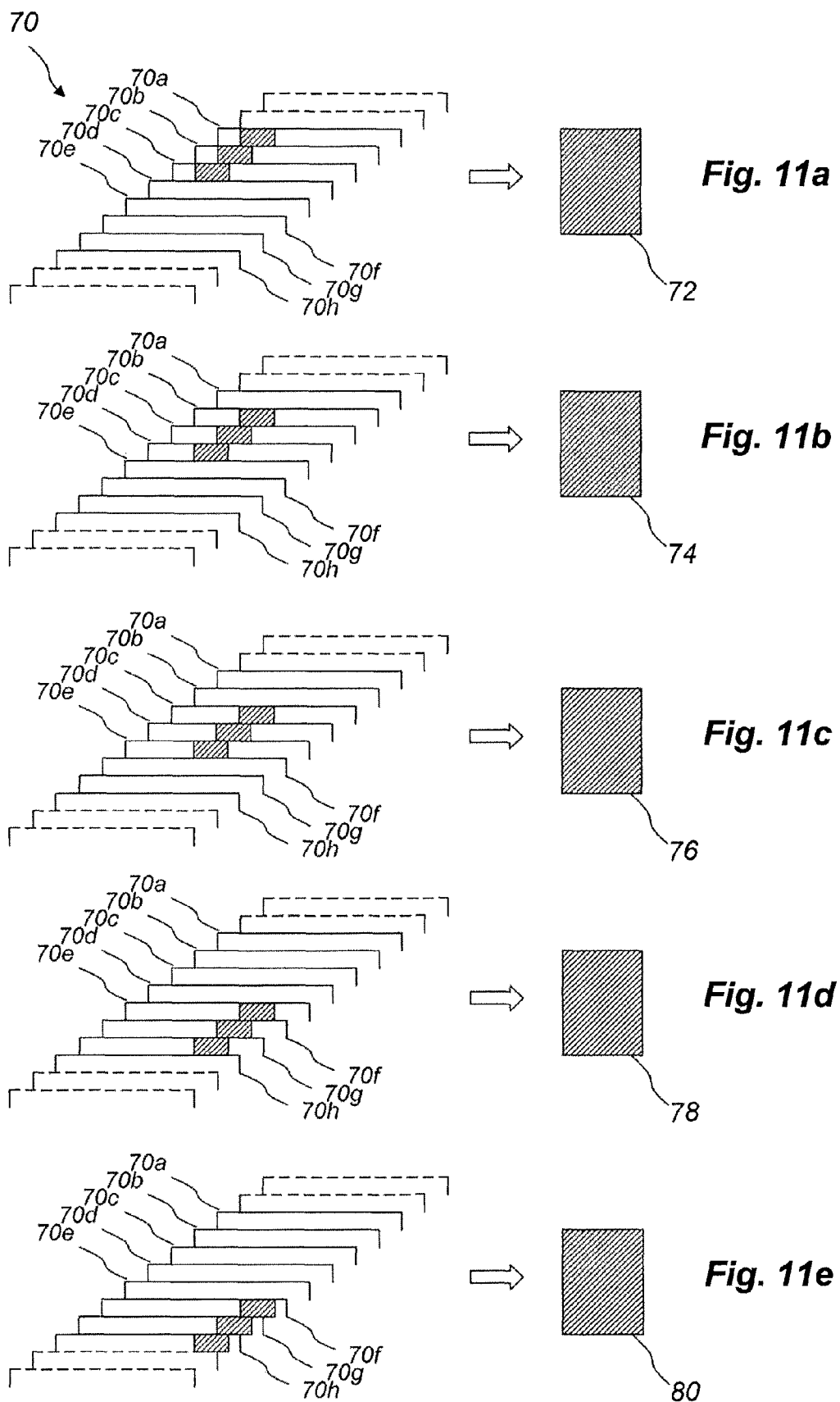

METHOD FOR FORMING IMAGES

TECHNICAL FIELD

The present inventive concept generally relates to the field of digital image processing and in particular to methods for forming images. The present inventive concept also relates to digital cameras configured to implement methods for forming images.

BACKGROUND

The availability of user friendly and capable digital cameras has made photography more popular and widely spread than ever before. The digital image format of the captured images allows both professionals and personal users to perform sophisticated editing and manipulation using e.g. computer software or in-camera functionality and thereby produce images which were difficult or impossible to achieve during the analog era of photography. Meanwhile, it has been decreasingly common to actually develop (i.e. print) images. As display technology has become both cheaper and more advanced, images are today mostly being displayed and viewed on a screen (e.g. a TV screen, a computer screen, a screen of a portable device such as a mobile phone, a portable media player, a portable gaming device etc.) A screen is much more versatile in terms of displaying images than a traditional print is and thus enable displaying and viewing of image content in entirely new ways, for example viewing of "three-dimensional" images. It also enables a beholder to interact with images, e.g. by zooming into an image, panning within an image etc.

These new ways for presenting image content has created a need for new ways of forming and capturing images which utilize the versatility of current display technology more fully. More specifically, there is a need for new ways of forming images without the need for specialized and expensive camera equipment.

SUMMARY

An object of the present inventive concept is thus to provide new ways of forming images. A further object is to enable forming of images which may be experienced in other ways than the traditional ways. A further object is to enable forming of such images without the need for specialized and expensive equipment.

According to a first aspect of the present inventive concept, there is provided a method for forming images, comprising:

providing a plurality of images, each image including a first image part and a second image part, and each image depicting a respective partial view, wherein there is an overlap between partial views depicted in pairs of consecutive images, forming a first combined image from the first image parts, which first combined image depicts a first continuous view, and forming a second combined image from the second image parts, which second combined image depicts a second continuous view, wherein the first and the second continuous views overlap.

By the inventive method, a first combined image and a second combined image may be formed, each depicting a region of overlap between the first and second continuous views however along different line of sights. As a result, the first and the second combined images may present a perceivable parallax effect. The first and the second combined image may thus be presented in a stereoscopic manner. The first combined image may for example be presented to the right eye of a beholder and the second combined image to the left eye, wherein the beholder may experience as if a single image having a depth dimension is displayed, i.e. a stereo effect. This experienced or perceived single image may be referred to as a "three-dimensional" image.

Moreover, the inventive method enables forming of such combined images from a plurality of images depicting overlapping partial views. The plurality of images may for example be captured by means of a digital camera having a single lens. The camera may for example simply be panned or scanned over a view wherein a plurality of images may be captured. The subsequent forming of the combined images may be performed either in the camera or on a computer once the images have been downloaded thereto. Hence, no specialized or expensive equipment is needed for creating "three-dimensional" images.

Furthermore since each of the first and second combined images are formed from image parts of a plurality of images, the method enables creation of panoramic three-dimensional images presenting viewing angles exceeding the limit set by the limited field of view of e.g. a camera lens.

According to one embodiment, the partial views are aligned along a horizontal direction. Adjacent partial views may present an overlap of at least 50% in a horizontal direction, i.e. adjacent partial views may present a horizontal overlap of at least 50%. According to an alternative embodiment, the partial views are aligned along a vertical direction.

According to one embodiment each provided image includes a third image part, wherein the first, second and third image parts are disjoint.

According to this embodiment, the first, the second and the third image parts do not overlap each other. The third image part may represent a part of the captured image located between the first and the second image parts. The method may thus utilize only a subset of the data of each provided image for generating the combined images. As one example, the third image part of each provided image may be disregarded during the forming of the first and second combined images. As a further example, the third image part of each provided image may be discarded prior to forming the first and the second combined images. This enables a reduction in the amount of data that needs to be stored and processed during performance of the inventive method.

The first image part may be a left image part. The right image part may be a right image part. The third image part may be located between the left image part and the right image part.

According to one embodiment the first and second image parts of each image together cover the entire image. This enables a particularly simple implementation of the method in that captured images simply may be divided into two parts which may be further processed. Especially, each of the two parts may constitute a half of the image.

According to one embodiment the method further comprises forming the first combined image and the second combined image such that the depiction of the first continuous view corresponds to the depiction of the second continuous view within a region of overlap. This simplifies forming of the first and the second combined images in a corresponding manner, i.e. such that for example an object or a group of objects visible in both the first and the second continuous view is/are depicted in a similar manner in the first and the second combined image. Thus, the risk of forming the first and the second combined images in different ways is reduced.

The method may for example comprise: determining, for at least one pair of consecutive images, a spatial relationship between a first image of the plurality of provided images and a second image of the plurality of provided images, the first and second images being a pair of consecutive images. The spatial relationship may be determined prior to forming the first and second combined images. Forming the first combined image may then include combining the first image part of said first image with the first image part of the second image in accordance with the spatial relationship. Furthermore, forming the second combined image may include combining the second image part of the first image with the second image part of the second image in accordance with the determined spatial relationship. This process may be repeated for each pair of consecutive images of the plurality of provided images. This method provides a comparably computationally efficient method for obtaining first and second combined images with a sufficient level of agreement. Advantageously the spatial relationship between the first and the second image is determined by analyzing a region of the first and second image, which region is larger than the first image part of the first and second image and the second image part of the first and second image. Thereby the spatial relationship may reflect the global relationship between the images, instead of following local features within the image parts. The positions of the pixels of an image part in a combined image may thus be calculated in a uniform manner using the determined spatial relationship.

Alternatively, the method may comprise: in response to forming the first combined image, determining alignment data for the second image parts by analyzing a relation between at least a subset of the second image parts and the first combined image, and forming the second combined image by combining the second image parts based on the alignment data. The second combined image is thus formed using the alignment data.

Alternatively, the method may comprise: forming a third combined image from the provided images prior to forming the first and the second combined image, determining first alignment data for the first image parts by analyzing a relation between at least a subset of the first image parts and the third combined image, determining second alignment data for the second image parts by analyzing a relation between at least a subset of the second image parts and the third combined image, forming the first combined image by combining the first image parts based on, i.e. using, the first alignment data, and forming the second combined image by combining the second image parts based on, i.e. using, the second alignment data.

Alternatively, the method may comprise: determining alignment data for the first image parts and the second image parts by analyzing a relation between at least a subset of the first image parts and at least a subset of the second image parts, forming the first combined image by combining the first image parts based on, i.e. using, the alignment data, and forming the second combined image by combining the second image parts based on, i.e. using, the alignment data.

According to one embodiment, the method further comprises: determining a relation between the first combined image and the second combined image, and generating data for aligning the first continuous view depicted in the first combined image with the second continuous view depicted in the second combined image. This alignment data enables accurate alignment between the combined images to be achieved when presenting the combined images to a beholder wherein a realistic three-dimensional effect may be achieved.

According to one embodiment the method further comprises cropping, based on the data for aligning, the first combined image and the second combined image such that their respective depicted continuous views align. This enables forming of the first and the second combined image such that they present the same dimensions. This simplifies a prospective presentation of a three-dimensional image.

According to one embodiment the method further comprises forming an image object based on the first combined image and the second combined image. The thus formed image object may hence include all information necessary for presentation of a three-dimensional image.

According to one embodiment the image object is formed by adding (e.g. by blending) a representation of the first combined image and a representation of the second combined image together. The representation of the first combined image may for example be a representation of the first combined image tinted in green and the representation of the second combined image may be a representation of the second combined image tinted in red. The image object may thus conveniently be displayed on a computer screen or printed wherein a beholder may view the image object through "three-dimensional glasses" including two different color filters, in this case red and green respectively.

According to one embodiment, each image of the provided images are provided in a compressed format comprising a stream of variable length encoded code words (e.g. Huffman encoded), the stream representing sequential image blocks. By compressing the captured images, the memory footprint may be reduced.

According to one embodiment the method further comprises generating indicators to at least some of the code words, wherein the indicators indicate the position of at least a DC coefficient of at least a subset of the image blocks. The indicators enable computationally efficient processing and manipulation of the captured images without necessitating decoding of the entire compressed bit stream. For example, the first and the second combined images may be formed using the indicators.

According to one embodiment providing the plurality of images comprises capturing the plurality of images by means of a digital camera.

According to one embodiment the provided images are captured from different positions. The different positions may be distributed along a curved path. The path may e.g. form an arc. The different positions may be different positions of the digital camera.

According to one embodiment the method further comprises performing a projective correction of the first and the second combined images. This may restore proportions within and between the first and second combined images which may have been deformed due to e.g. a panning movement of the digital camera.

According to one embodiment, the method may further comprise performing a projective correction of the image parts, prior to forming the first and second combined images. In addition to the above-mentioned advantage, this may simplify formation of the first and second combined images in that image parts may be combined together in a more precise manner.

The projective correction may e.g. comprise a cylindrical projection. This may increase the convenience for a user in that the method does not impose any cumbersome constraints on how a user may move the camera between the image captures. Furthermore, by subjecting the images (e.g. the image parts or the combined images) to projective corrections a more realistic three-dimensional effect may be achieved.

According to one embodiment, the method may be implemented in a digital camera.

According to a second aspect, there is provided a method for forming images, comprising:

providing a plurality of images, each image depicting a respective view, wherein there is an overlap between views depicted in pairs of consecutive images and wherein the respective depicted views together define a continuous view, determining a partial view of the continuous view, forming, from a first image part of each image of a first subset of the provided images, a first combined image representing the partial view, forming, from a second image part of each image of a second subset of the provided images, a second combined image representing the partial view.

By the inventive method, a first combined image and a second combined image may be obtained, wherein the first combined image depicts a representation of the partial view as viewed from a first position and the second combined image depicts a representation of the partial view as viewed from a second position, which is different from the first position. Thus, a beholder viewing the first and second combined images in a succession may experience a sequential displaying of the partial view from different directions. In the succession, depicted objects at different distances from the camera may appear to be translated at different rates. This may create a sense of depth for the beholder. The method may hence be used for creating and displaying realistically looking images having a perceivable depth from a plurality of provided images.

Furthermore, by forming the combined images using parts of a plurality of provided images, the method enables production of panoramic image sequences wherein each image presents viewing angles exceeding the limit set by the limited field of view of e.g. a camera lens.

According to one embodiment, the first set of images includes at least one image which is not included in the second set of images.

According to one embodiment, the first set of images and the second set of images includes at least one common image.

According to one embodiment, the first image part and the second image part are different parts of the at least one common image.

According to one embodiment, the relative positions of the first image parts in their respective images are corresponding and the relative positions of the second image parts in their respective images are corresponding.

According to one embodiment the method further comprises: forming, from a third image part of each image of a third subset of the provided images, a third combined image representing the partial view. The third combined image may depict a representation of the partial view as viewed from a third position which is different from the first and the second positions. By extending the method to forming further combined images a partial view may be displayed from further directions.

According to one embodiment, the method further comprises displaying the first combined image on a display and, in response to a first user input, displaying the second combined image and, in response to a second user input, displaying the third combined image. This enables a user to interactively "explore" the partial view from different directions.

According to one embodiment, the method further comprises providing an image sequence including the combined images. The image sequence may be stored as e.g. a movie sequence or a slide show for convenient playback of the representations of the partial view. Alternatively, the image sequence may comprise parameters indicating what image parts should be used for forming each combined image and in what order the formed combined images may be displayed. The image sequence may thus be read wherein the combined images may be formed in real-time and displayed in sequence.

According to one embodiment, the partial views are aligned along a horizontal direction. Adjacent partial views may present an overlap of at least 50% in a horizontal direction, i.e. adjacent partial views may present a horizontal overlap of at least 50%. According to an alternative embodiment, the partial views are aligned along a vertical direction.

According to one embodiment, the method further comprises forming the first combined image and the second combined image such that the representation of the partial view by the first combined image corresponds to the representation of the partial view by the second combined image. This simplifies forming of the first and the second combined images in a corresponding manner, i.e. such that for example an object or a group of objects visible in both the first and the second representations of the partial view is/are depicted in a similar manner in the first and the second combined image. Thus, the risk of forming the first and the second combined images in different ways is reduced.

The method may e.g. comprise: in response to forming the first combined image, determining alignment data for the second image parts by analyzing a relation between at least a subset of the second image parts and the first combined image, and forming the second combined image by combining the second image parts based on, i.e. using, the alignment data.

Alternatively, the method may comprise: forming a fourth combined image from the provided images prior to forming the first and the second combined image, determining first alignment data for the first image parts by analyzing a relation between at least a subset of the first image parts and the fourth combined image, determining second alignment data for the second image parts by analyzing a relation between at least a subset of the second image parts and the fourth combined image, forming the first combined image by combining the first image parts based on, i.e. using, the first alignment data, and forming the second combined image by combining the second image parts based on, i.e. using, the second alignment data.

Alternatively, the method may comprise: determining a spatial relationship between a first image of the plurality of provided images and a second image of the plurality of provided images, the first and second images being a pair of consecutive images. The spatial relationship may be determined prior to forming the first and second combined images. Forming the first combined image may then include combining a first image part of said first image with a first image part of the second image in accordance with the spatial relationship. Furthermore, forming the second combined image may include combining a second image part of the first image with a second image part of the second image in accordance with the determined spatial relationship. This process may be repeated for each pair of consecutive images of the plurality of provided images. This method provides a comparably computationally efficient method for obtaining first and second combined images with a sufficient level of agreement. Advantageously the spatial relationship between the first and the second image is determined by analyzing a region of the first and second image, which region is larger than the first image part of the first and second image and the second image part of the first and second image. Thereby the spatial relationship may reflect the global relationship between the images, instead of following local features within the image parts. The positions of the pixels of an image part in a combined image may thus be calculated in a uniform manner using the determined spatial relationship.

Alternatively, the method may comprise: determining alignment data for a pair of the first image parts, the pair depicting a pair of adjacent view portions, by analyzing a second image part of the captured images, which second image part depicts a view portion partly overlapping the pair of adjacent view portions, forming the first combined image by combining the first image parts based on, i.e. using, the alignment data, and forming the second combined image by combining the second image parts based on, i.e. using, the alignment data.

According to one embodiment, each image of the provided images is provided in a compressed format comprising a stream of variable length encoded code words (e.g. Huffman encoded), the stream representing sequential image blocks. By compressing the captured images, the memory footprint may be reduced.

According to one embodiment the method further comprises generating indicators to at least some of the code words, wherein the indicators indicate the position of at least a DC coefficient of at least a subset of the image blocks. The indicators enable computationally efficient processing and manipulation of the captured images without necessitating decoding of the entire compressed bit stream. For example, the first and the second combined images may be formed using the indicators.

According to one embodiment providing the plurality of images comprises capturing the plurality of images by means of a digital camera.

According to one embodiment the provided images are captured from different positions. The different points may be positioned along a curved path. The path may e.g. form an arc. The different positions may be different positions of the digital camera.

According to one embodiment the method further comprises performing a projective correction of the combined images. This may restore proportions within and between e.g. the first and second combined images which may have been deformed due to the panning movement of the camera.

According to one embodiment, the method may further comprise performing a projective correction of the image parts, prior to forming the combined images. In addition to the above-mentioned advantage, this may simplify formation of the combined images in that image parts may be combined together in a more precise manner.

The projective correction may e.g. comprise a cylindrical projection. This may increase the convenience for a user in that the method does not impose any cumbersome constraints on how a user may move the camera between the image captures. Furthermore, by subjecting the images (e.g. the image parts or the combined images) to projective correction a more realistic effect may be achieved.

According to one embodiment, the method may be implemented in a digital camera.

Other aspects, objectives, features and advantages of the present inventive concept will be apparent from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one in-stance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

Embodiments and aspects of the present inventive concept will now be described in more detail, reference being made to the enclosed drawings, in which:

FIGS. 11a-e illustrate a method according to a second embodiment of the first aspect.

DETAILED DESCRIPTION OF PREFERRED EMBODIMENTS

Figure 1:
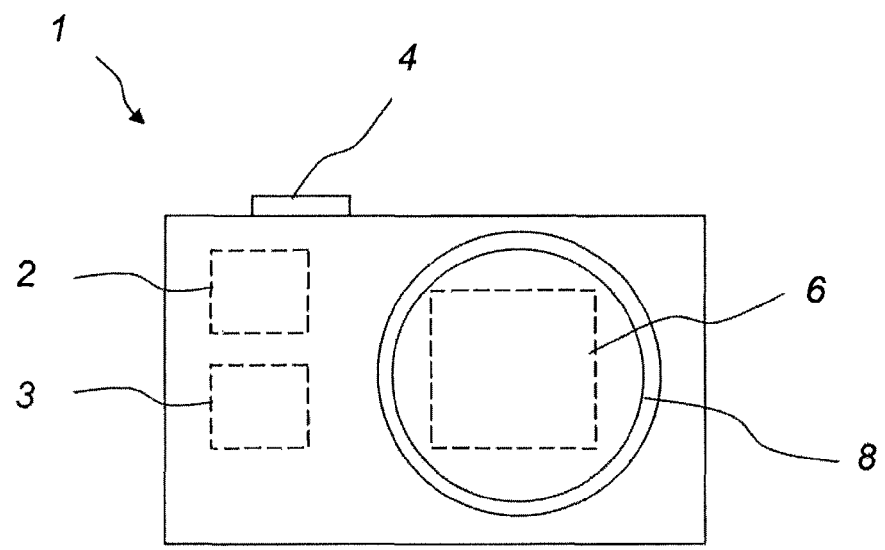
FIG. 1 schematically illustrates a camera for implementing methods according to the aspects of the present inventive concept.

In the following, methods of forming images in accordance with various aspects of the present inventive concept will be described with reference to a digital camera 1 shown in FIG. 1. The digital camera 1 may e.g. be a compact camera, a point-and-shoot camera, a digital SLR camera or a video camera (e.g. a camcorder) having still camera functionality, etc. The digital camera may also be incorporated in a mobile phone, a PDA or some other computing device.

The camera 1 comprises a processor 2, e.g. a microprocessor, a memory section 3, and input means 4 allowing user control of the camera 1. The camera 1 further comprises a view finder (not shown for clarity). The view finder may be an optical view finder. The view finder may form part of a display of the camera 1. The display may be a touch screen wherein the input means may form part of the display. The camera 1 further includes an image sensor 6 (e.g. a CCD or a CMOS sensor) and a lens 8. The image sensor 6 may be connected to an associated data buffer or cache memory for allowing temporary storing and transfer of data relating to captured images during initial image processing stages.

The memory section 3 includes a program section storing software instructions for implementing any of the methods which will be described in detail below. The processor 2 is configured to execute the software instructions. Alternatively, the methods may be implemented and performed by other means, e.g. in an ASIC, an FPGA or other dedicated electronic circuitry. The memory section 3 further includes a data section for storing captured images for viewing and further processing. The camera 1 may further include means for sensing movement and direction of the camera 1, e.g. a compass, a gyroscope, an accelerometer (not shown for clarity).

A method for capturing images in accordance with a first embodiment of the first aspect of the inventive concept will now be described with reference to FIGS. 2-5. In the following, "capturing" of an image is to be construed as the process during which the camera 1 records the electric signals generated by light incident on the image sensor 6 of the camera 1 after appropriate signal processing, unless otherwise is explicitly stated.

Figure 2A:
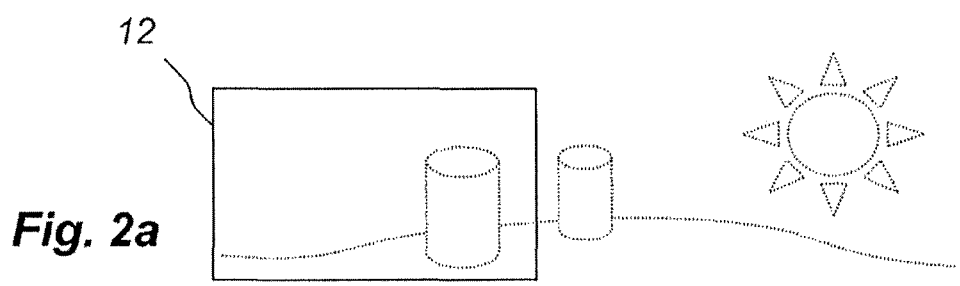
FIG. 2 schematically illustrates a plurality of images captured by the camera, each depicting a part of a full view.
Figure 2B:
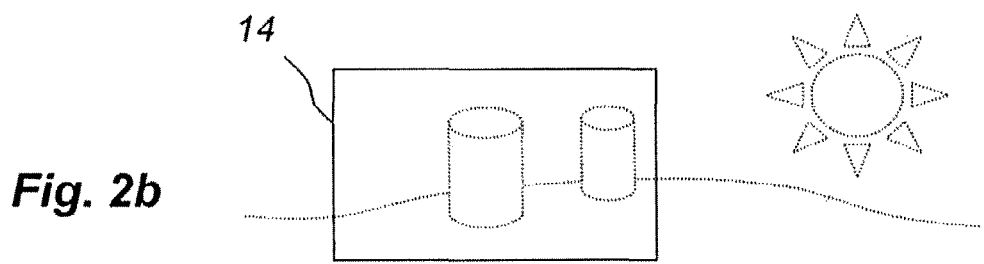
Figure 2C:
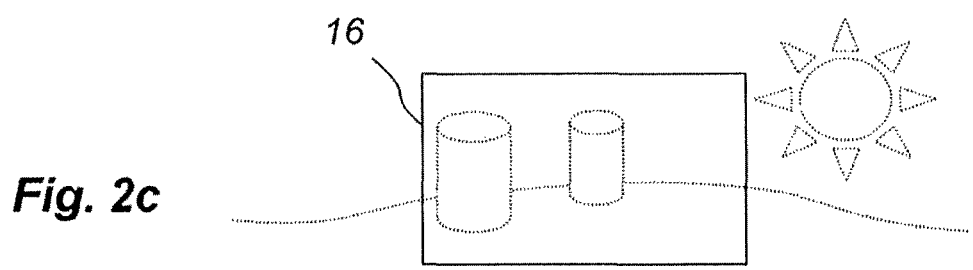

According to the method, a plurality of images 10 is captured by the camera 1. FIGS. 2a-c illustrate the capturing of three images 12, 14 and 16, respectively, of the plurality of images 10. As illustrated in FIG. 2, each image of the plurality of images 10 depicts a portion of a full view, i.e. a partial view. In FIGS. 2a-c an example full view is shown with dotted lines. The partial views are aligned along a horizontal direction. The images 12, 14, 16 may be captured from points along a curved path. For example a user may pan the camera across the full view with arms extended in front of him. In order to aid understanding of the method, the frames of the images 10 are illustrated in relation to the partial view they depict. As shown in FIG. 2, there is an overlap between partial views depicted in pairs of consecutively captured images. I.e. the partial view depicted in image 12 overlaps the partial view depicted in image 14. Similarly, the partial view depicted in image 14 overlaps the partial view depicted in image 16. In other words, there is an overlap between adjacent partial views.

In the following, the existence of an overlap between two views implies that a feature (or part of a feature) within the first view is visible also within the second view, although from a different viewing angle. As a consequence, an image depicting the first view and an image depicting the second view will both include a representation of the feature within the two views. In this sense, these two images may be referred to as overlapping images.

The images 10 may be captured manually. The user may direct the camera 1 towards the first partial view and press a capture button of the camera 1 for capturing the first image 12. The camera 1 may then allow the user to direct the camera 1 towards the second partial view and press the capture button for capturing the second image 14. A similar process may be followed for capturing further images. Alternatively, the images 10 may be captured automatically. The user may simply pan the camera over the view while the camera automatically captures the images 10. The camera 1 may be configured to repeatedly capture images separated by some time interval (e.g. 0.1 s, 0.5 s, 1 s etc). The camera 1 may be configured to track the direction and position of the camera 1 and capture images after a preset movement. The camera 1 may be configured to capture temporary images (e.g. images for display on a digital view finder) and analyze a relation between a previously captured image and a current temporary image and automatically capture further images when the direction is considered to be appropriate for forming a combined image from the captured images.

Regardless of whether the images are captured manually or automatically, the method may proceed with partitioning each image 10 into a first image part and a second image part. This is illustrated for image 12 in FIG. 3 including the first image part 12a and the second image part 12b. The first image part 12a is located to the left of the second image part 12b. The second image part 12b is located to the right of the first image part 12a. The first and second image parts 12a and 12b are disjoint, i.e. they do not overlap.

The relative positions of the first image parts 10a within the images 10 are the same. The relative positions of the second image parts 10b within the images 10 are also the same.

Figure 4:
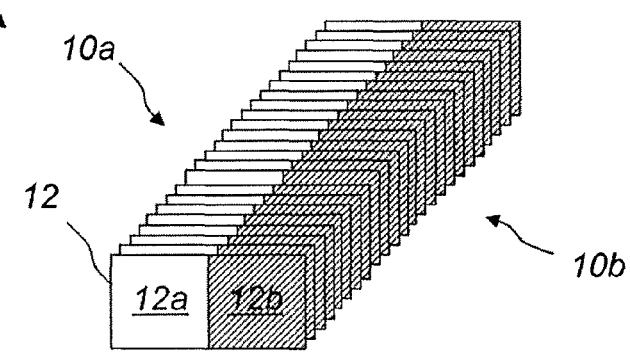

The result of this partitioning is conceptually visualized in FIG. 4 for all images 10, wherein the first image parts 10a are shown unfilled and the second image parts 10b are shown shaded. In FIG. 4 (and further in FIG. 5) the images 10 are illustrated horizontally offset with respect to each other. The horizontal offset corresponds to the relation and overlap between the partial views depicted by the images 10. The images 10 are also illustrated slightly vertically offset with respect to each other. However, this vertical offset is present only for visualization purposes for simplifying understanding of the method.

Figure 3:
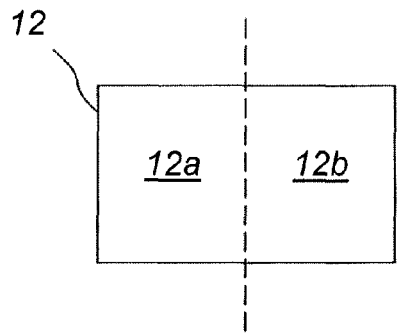
FIGS. 3-5 illustrate a method according to a first embodiment of a first aspect.

In FIGS. 3 and 4, each image part constitutes a half of an image. The first image part 12a and the second image part 12b thus present the same width, i.e. they include the same number of pixel columns. The inventive concept is however not limited to this configuration; the first image part 12a may include more pixel columns than the second image part 12b or vice versa.

In FIG. 4 the amount of overlap between all pairs of adjacent partial views is uniform. However, the inventive concept is not limited to such a configuration. Rather, there may be different overlap between different pairs of depicted adjacent partial views.

The first image parts 10a each depict a portion of the partial views depicted in the images 10. According to the present embodiment, each pair of the adjacent partial views overlap to such an extent that also the view portions depicted in the first image parts of each pair of consecutively captured images present an overlap. The first image parts 10a may thus be combined such that they depict a first single continuous view. Correspondingly, the second image parts 10b may be combined such that they depict a second single continuous view.

According to the method, a first combined image 24 is formed from the first image parts 10a. The first image parts 10a may be analyzed in order to identify corresponding features in the image parts 10a and be stitched together to form the first combined image 24. The corresponding features may be identified by image analysis in either the spatial domain or in the frequency domain using techniques which per se are well-known in the art. Alternatively, the image parts 10a may be blended together. A second combined image 26 may be formed from the second image parts 10b in a corresponding manner.

In more detail, the first combined image 24 may be formed as follows: The first image part 12a of a first one of the images 10 is compared to the first image part 12a of a second one of the images 10 in order to determine an alignment between the two image parts. The two image parts are then combined to form a first temporary combined image. The first temporary combined image is then compared to the first image part 12a of a third one of the images 10 in order to determine an alignment between the first temporary combined image and the image part. The first temporary combined image and the image part are then combined to form a second temporary combined image. This process may be repeated until the first image parts 10a of all captured images have been combined. A similar process may be performed for the second image parts 10b.

Figure 5:
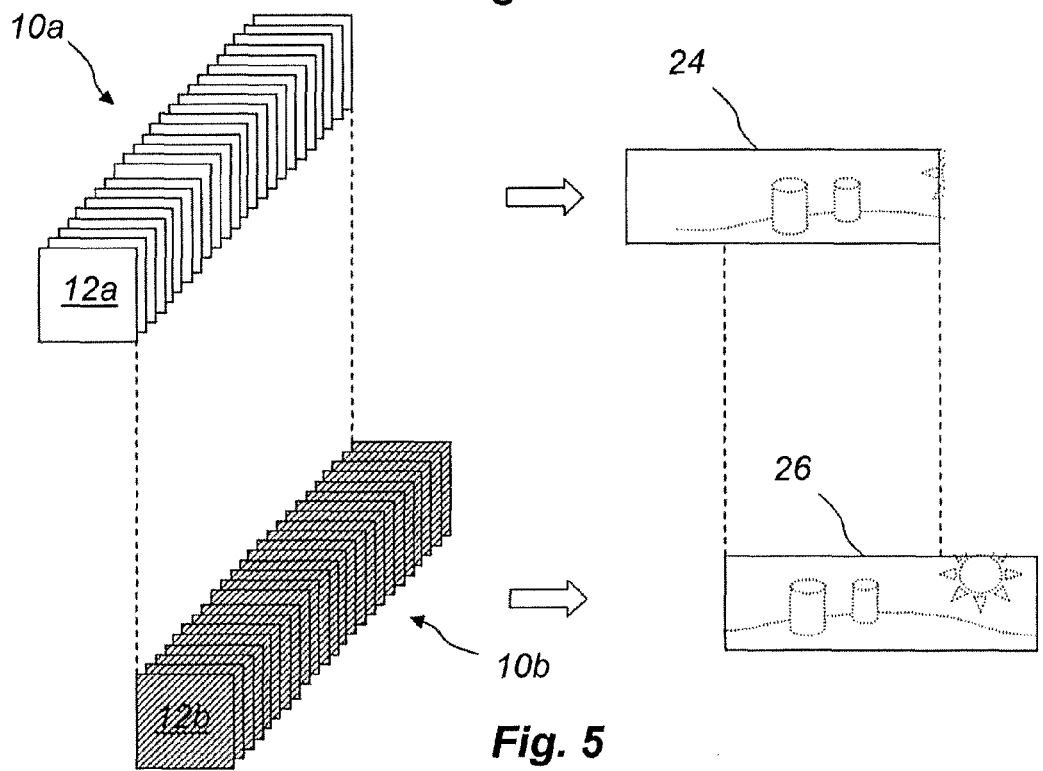

The thus formed first and second combined images 24, 26 depict a first continuous view portion of the full view and a second continuous view portion of the full view, respectively. As shown in FIG. 5, the first continuous view and the second continuous view overlap. In other words, this region of overlap is depicted in both the first and the second combined images 24, 26 albeit along different line of sights. As a result, there may be a perceivable parallax effect between the portions of the first and second combined images 24, 26 depicting the region of overlap.

During the forming of the combined images 24, 26, the image parts 10a and 10b may be cropped such that the upper vertical edges of the image parts align and the lower vertical edges of the image parts align. This may be advantageous if any of the partial views depicted in the images 10 extend beyond the other partial views in a vertical direction.

The combined images 24 and 26 may further be subjected to perspective correction. In case the images 10 have been captured from points along an arc, a cylindrical projection may be especially effective. Alternatively, the image parts 10a, 10b may be subjected to perspective correction prior to the forming of the combined images 24, 26.

The method may during forming of the portion in the first combined image 24 depicting the region of overlap give priority to the first image part of the image captured the most far to the right. Correspondingly, the method may during forming of the portion in the second combined image 26 depicting the region of overlap give priority to the second image part of the image captured the most far to the left. The camera positions at which these image parts were captured have the maximum separation. By giving priority to the image parts 22a and 12b, the parallax effect between the first and second combined images 24, 26 may thus be maximized.

As may be understood from FIGS. 4-5, the captured images 10 may include redundant image information. For example there is an overlap between many of the views depicted in the first image parts 10a. During forming of the first combined image 24, the first image parts being most suitable for forming the combined image 24 may be used (e.g. the image parts presenting the best overall sharpness, the best exposure, the most appropriate overlap etc.) The redundant image information may also be used for improving the quality of the first combined image 24. For example, the first image parts 10a may be combined in order to reduce image noise and motion blur, or to increase the dynamic range of the image.

The first combined image 24 and the second combined image 26 may be presented in stereo to a beholder. By presenting the first combined image 24 to the right eye of a beholder and presenting the second combined image 26 to the left eye of a beholder, the beholder may experience as if a single image having a depth dimension is presented to him.

This presentation may be achieved in a plurality of different ways: For example, the first combined image 24 and the second combined image 26 may each be projected on a screen by a respective picture projector in differently polarized light. The combined images 24, 26 may be projected on top of each other. A three dimensional effect may thus be experienced by a viewer wearing "three-dimensional glasses" including one polarizer transmitting the first image channel as a right lens and one polarizer transmitting the second image channel as a left lens. Alternatively, the combined images 24, 26 may be tinted in different colors, e.g. red and green, and projected on a screen. A three dimensional effect may thus be experienced by a viewer wearing "colored three-dimensional glasses" including a red filter as a right lens and a green filter as a left lens (or vice versa).

An image object may also be generated using the first combined image 24 and the second combined image 26. An alignment between the first combined image 24 and the second combined image may be determined by identifying at least one corresponding feature in the images 24, 26. Based on the determined alignment, the first and the second combined image 24, 26 may be cropped such that their respective depicted view portions align. The image object may then be generated by adding a representation of the first combined image 24 and a representation of the second combined image 26 together. The representation of the first combined image 24 may for example be a representation of the first combined image 24 tinted in green and the representation of the second combined image 26 may be a representation of the second combined image 26 tinted in red. Such an image object may be displayed and viewed, through the above-mentioned "colored three-dimensional glasses", on the screen of the camera 1 or on some other screen, e.g. a computer screen, or a TV screen etc. The image object may for example be stored as a standard image file such as JPEG or TIFF. Alternatively, the first and the second combined images may be stored as a stereo JPEG (i.e. JPS).

The formation of the first and the second combined images 24, 26 may be somewhat random in nature. Hence, the first image parts 10a may be combined in a slightly different manner than the second image parts 10b. Such errors in the forming of the combined images 24 and 26 may result in that proportions and distances between features in the first combined image 24 may be different from the proportions and distances between the corresponding features in the second combined image 26. This may destroy the relation between the combined images 24 and 26. It may further result in that the first and the second combined images 24, 26 are formed with different widths. This may especially be a problem in the portions of the combined images depicting the overlapping region between the first and second continuous views. This problem may be reduced by forming the first combined image and the second combined image such that the depiction of the first continuous view corresponds to the depiction of the second continuous view within the region of overlap. In more detail, this may be achieved as follows:

A first alignment technique reducing this problem is to first form the first combined image 24 in the above-described manner. Once the first combined image 24 has been formed it may be used for determining how the second image parts 10b may be combined. A second image part may be compared (e.g. using prior art image analysis techniques) to the first combined image 24 in order to identify features (e.g. edges, objects etc.) common to this second image part and the first combined image 24. This process may be repeated for further second image parts. The distance (e.g. in pixels) between the identified features in the first combined image 24 may be used as alignment data for forming the second combined image 26. More specifically, the second image parts 10b may be combined (e.g. blended together or stitched) to form the second combined image 26 such that the distance between the identified features in the second combined image 26 corresponds to the distance between the corresponding features in the first combined image 24.

It may suffice to determine a relation between a subset of the second image parts 10b and the first combined image 24. For example, second image parts which do not depict any portion within the overlapping region need not be analyzed (e.g. the first image part of the image captured at the leftmost camera position and the second image part of the image captured at the rightmost camera position).

A second alignment technique reducing the above-mentioned problem is to form a third combined image from the captured images 10 (e.g. by stitching or blending as described above). Once the third combined image has been formed it may be used for determining how the first image parts 10a may be combined. A first image part may be compared (e.g. using prior art image analysis techniques) to the third combined image in order to identify features (e.g. edges, objects etc.) common to this first image part and the third combined image. This process may be repeated for the further first image parts. The distance (e.g. in pixels) between the identified features in the third combined image may be used as alignment data for forming the first combined image 26. More specifically, the first image parts 10a may be combined (e.g. blended together or stitched) to form the first combined image 24 such that the distance between the identified features in the first combined image 24 corresponds to the distance between the corresponding features in the third combined image. This process may be repeated for the second image parts 10b.

It may suffice to determine a relation between a subset of the image parts 10a, 10b and the third combined image. For example, an image part which does not depict any portion within the overlapping region need not be analyzed (e.g. the first image part of the image captured at the leftmost camera position and the second image part of the image captured at the rightmost camera position).

A third alignment technique reducing the above-mentioned problem is to analyze a relation between at least a subset of the first image parts 10a and at least a subset of the second image parts 10b. More specifically, a first image part may be compared (e.g. using prior art image analysis techniques) to the at least some of the second image parts 10b in order to identify features (e.g. edges, objects etc.) common to this first image part and at least one of the second image parts 10b. This process may be repeated for the further first image parts. The distance (e.g. in pixels) between the identified features in the image parts 10a, 10b may be used as alignment data for forming the first combined image 26. More specifically, the first image parts 10a may be combined (e.g. blended together or stitched) to form the first combined image 24 such that the distance between the identified features in the first combined image 24 corresponds to the distance between the corresponding features in the second image parts 10b. The second combined image 26 may then be formed in a corresponding manner by combining the second image parts 10b using the alignment data.

It may suffice to determine a relation between a subset of the image parts. For example, an image part which does not depict any portion within the overlapping region need not be analyzed (e.g. the first image part of the image captured at the leftmost camera position and the second image part of the image captured at the rightmost camera position).

Due to optical distortions and non-uniformity between the captured images 10, it may not be possible to achieve an exact alignment between the image portions of the first and second combined images 24, 26 depicting the region of overlap of the first and second continuous views. Hence, the method may form the combined images such that a total alignment error (e.g. the sum of all distance deviations) between features within the combined images is minimized.

A fourth alignment technique reducing the above-mentioned problem proceeds as follows: A temporary first combined image is formed by combining the first image parts 10a based on an assumed overlap between the partial views. A temporary second combined image is formed by combining the second image parts 10b based on an assumed overlap between the partial views. The assumed overlaps may e.g. be 10% of the width of the image parts 10a, 10b. The temporary first and second combined images may then be compared to each other in order to determine an alignment error between them. The alignment error may e.g. be a mean error per pixel for at least a subset of the pixels in the temporary first and second combined images. This process may then be repeated further times using further assumed overlaps between the first image parts 10a as well as the second image parts 10b. The further assumed overlaps may e.g. be 15%, 20%, 25% etc. For each of these further assumed overlaps, a further temporary first combined image and temporary second combined image may be formed, wherein each resulting alignment error may be determined. The final first and second combined images 24, 26 may then be formed using the amount of assumed overlap resulting in the smallest alignment error.

Additionally, once the assumed overlap resulting in the smallest alignment error has been determined, the first and second temporary combined images may be fine-tuned in order to further reduce the alignment error, e.g. by iteratively adjusting alignment between image portions and determining the resulting alignment error until a minimum alignment error has been reached. The final first and second combined images 24, 26 may then be formed using the fine-tuned overlap.

It should be noted that this process may be performed either in the spatial domain or in the frequency domain.

According to yet another technique, prior to forming the first and the second combined images 24, 26, pairs of consecutive images in the set of captured images 10 may be analyzed to determine data indicating a spatial relationship between the images of the pairs. The data may form alignment data indicating how the images of a pair may be combined to obtain an overlap between corresponding features in the images. The data may for example indicate the distance (e.g. in units of pixels) between the lower left corner of the first image of the pair and the lower left corner of the second image of the pair. The first image part 10a of the first image of the pair and the first image part 10a of the second image of the pair may then be combined in accordance with the determined spatial relationship. Said first image parts may for example be combined such that the distance between the lower left corner of the first image part of said first image of the pair and the lower left corner of the first image part of said second image of the pair corresponds to or equals the distance determined for said first and second image. Similarly, the second image parts 10b of the first image and the second image of the pair may be combined such that the distance between the lower left corner of the second image part of said first image of the pair and the lower left corner of the second image part of said second image of the pair corresponds to or equals the distance determined for said first and second image.

The process may then proceed with combining the first image parts of said first and second image with the first image part of a third image in the set of captured images 10 and combining the second image parts of said first and second image with the second image part of said third image, wherein the second and third images constitutes a pair of consecutive images. This process may be repeated for each pair of consecutive images of the set of images 10 in order to form the first and second combined images 24 and 26.

In the above, reference is made to the lower left corner of the images and image parts, however this is only an example and other reference points in the images and image parts may also be used, e.g. the center point, the upper left corner, the upper right corner, the lower right corner, the midpoint along an edge of the images and image parts to name a few. Similar to the above described techniques the relationship between images may be determined by identifying common features in the captured images 10 using prior art image analysis techniques. Optionally the images of each pair may be subjected to the above-mentioned projection prior to determining their spatial relationship. Similarly the image parts may be subjected to the projection prior to combining them.

In order to reduce the amount of data that needs to be stored, the captured images 10 may provided in a compressed format. Each of the captured images 10 may e.g. be compressed in accordance with the JPEG standard wherein a compressed image may comprise a stream of code words encoded using a Variable Length Code (VLC) such as Huffman codes, the stream representing sequential image blocks.

The method may comprise, in response to capturing each image, generating indicators to at least some of the code words, wherein the indicators indicate the position of at least a DC coefficient of at least a subset of the image blocks. The images may e.g. be compressed into Random Access JPEGs, the details of which are disclosed in international patent publication WO 2005/050567 and therefore will not be further described herein. By using these indicators, the image parts 10a, 10b may be extracted without requiring decoding of the entire captured images. The combined images may thus be formed in a computationally efficient manner.

In more detail, an image part (e.g. 12a) may be extracted as follows:

A plurality of auxiliary code blocks may be generated and inserted in the sequence of image blocks making up the image part 12a, wherein an auxiliary code block comprises an auxiliary parameter based on the DC coefficient of a last code block of a first row of image blocks in the image part 12a and the DC coefficient of a first code block of a subsequent row of image blocks in the image part 12a. This may be repeated for all image block rows in the image part 12a. The relevant image blocks may be located using the indicators. The image part may thus 12a be extracted without requiring decoding of the entire captured image 12 and without requiring decoding of all image blocks in the image part 12a. Extraction of an image part from a full compressed image is described in further detail in international patent publication WO 2010/072587 and will therefore not be further elaborated on herein.

In the above, the captured images 10 were partitioned into first and second image parts 10a, 10b covering the entire respective image. According to a second, alternative embodiment, captured images may be partitioned differently. According to the second embodiment and with reference to FIGS. 6-8, a plurality of images 30 is captured by the camera 1. Hence, analogously to the images 10, the images 30 depict respective partial views, wherein there is an overlap between partial views depicted in pairs of consecutively captured images. In other words, there is an overlap between adjacent partial views.

According to the method each image of the plurality of images 30 is partitioned into a first image part and a second image part. This is illustrated for image 32 in FIG. 6 including the first image part 32a and the second image part 32b. The first image part 32a is a left image part. The second image part 32b is a right image part. The first and second image parts 12a and 12b are disjoint. However, in contrast to the first embodiment the first image part 32a and the second image part 32b do not cover the entire image 32. In other words, the image 32 includes a third image part which forms part with neither the first image part 32a nor the second image part 32b. The third image part is located between the first image part 32a and the second image part 32b.

Figure 7:
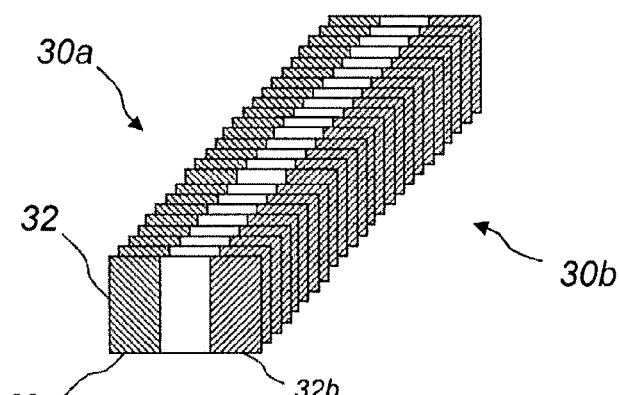

The result of this partitioning is conceptually visualized in FIG. 7 for all images 30, wherein 30a refers to the first image parts and 30b refers to the second image parts. The relative positions of the first image parts 30a within the images 30 are the same. The relative positions of the second image parts 30b within the images 30 are the same.

Figure 6:
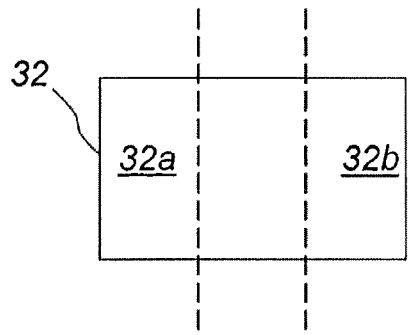
FIGS. 6-8 illustrate a method according to a second embodiment of the first aspect.

In FIGS. 6 and 7, the first image parts 32a and the second image part 32b present the same width. The inventive concept is however not limited to this configuration; the first image part 32a may include more pixel columns than the second image part 32b or vice versa. Furthermore, the first and second image parts 32a and 32b are illustrated as leftmost and rightmost image parts, respectively. The inventive concept is however not limited to this configuration but the first and second image parts 32a and 32b may be located some distance from the vertical edges of the image 32.

Figure 8:
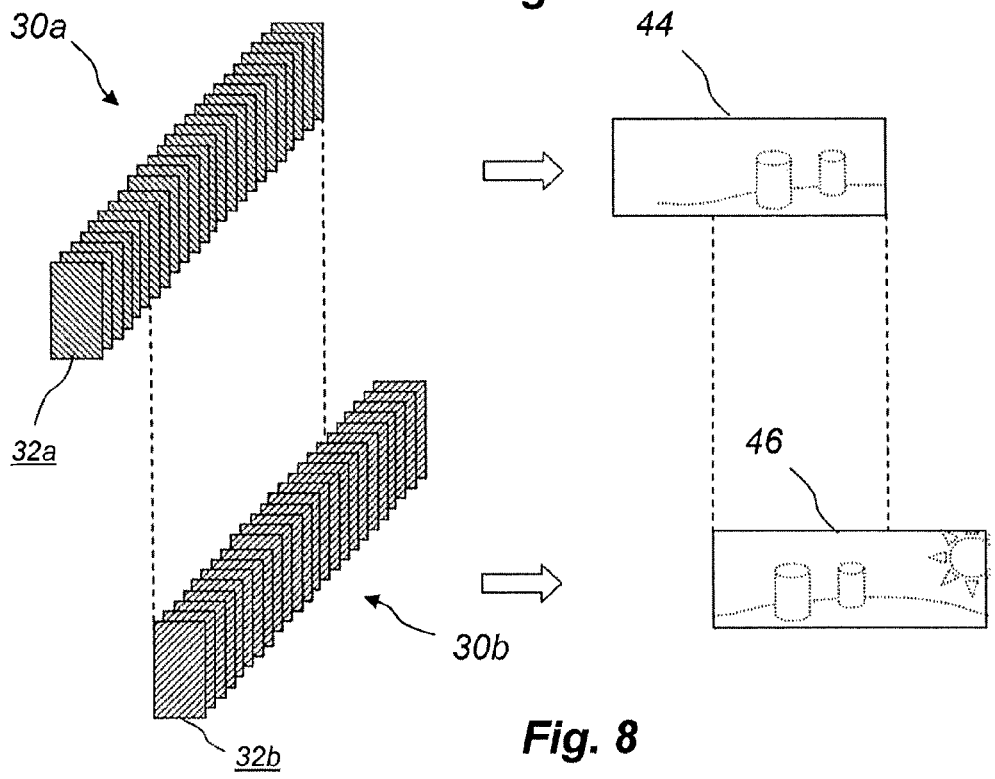

In the same manner as in the first embodiment, the first image parts 30a may be combined to form a first combined image 44. Correspondingly, the second image parts 30b may be combined to form a second combined image 46. This is illustrated in FIG. 8. The first combined image 44 depicts a first continuous view and the second combined image 46 depicts a second continuous view, which continuous views overlap.

By the partitioning of the captured images 30 into first, second and third image parts, the amount of data that needs to be stored and processed may be advantageously reduced. This advantage may be especially pronounced when capturing many images depicting views which overlap to a large extent.

For example, the method may comprise discarding the data corresponding to the third image part of each captured image. This may be performed either in hardware at the time of capturing the images 30 or in software after the images 30 have been captured and stored. In any case, the third image parts may be disregarded in the subsequent image processing and image formation.

A method for forming images in accordance with a first embodiment of a second aspect of the inventive concept will now be described with reference to FIGS. 9a-c. According to the method, a plurality of images 50 is captured by the camera 1. Similar to the above-described first aspect, the images 50 may be captured from different positions of the camera 1. The positions may e.g. be distributed along a curved path. The captured images 50 are similar to the captured images 10 and 30 in that they depict views, wherein there is an overlap between views depicted in pairs of consecutively captured images. In other words, there is an overlap between adjacent depicted views. The depicted views thus together define a continuous view. This continuous view will in the following be referred to as "the complete continuous view".

In FIG. 9 (and further in FIG. 10) the images 50 are illustrated horizontally offset with respect to each other. The horizontal offset corresponds to the overlap between the partial views depicted by the images 50. The images 50 are also illustrated slightly vertically offset with respect to each other. However, this vertical offset is present only for visualization purposes for simplifying understanding of the method.

Figure 9A:
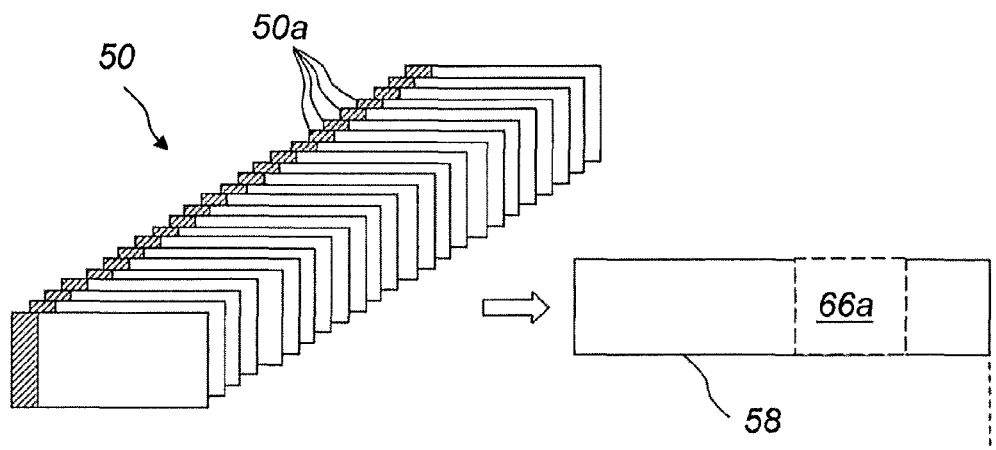
FIGS. 9a-c and 10 illustrate a method according to a first embodiment of a second aspect.
Figure 9B:
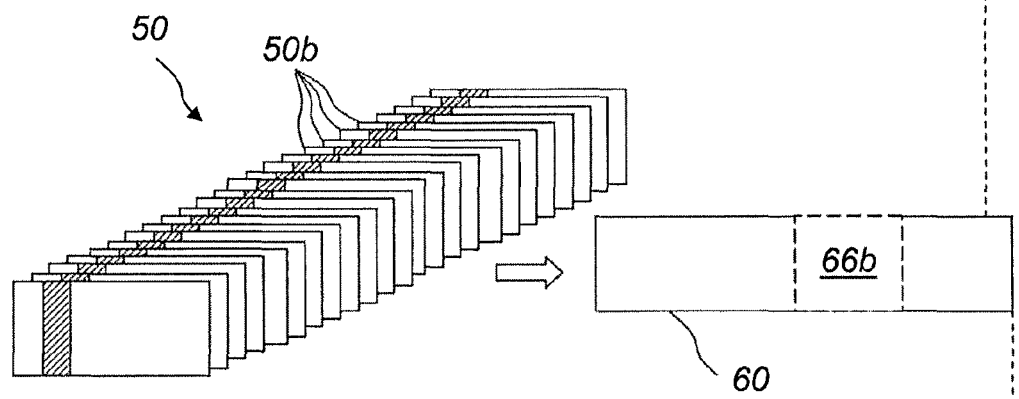
Figure 9C:
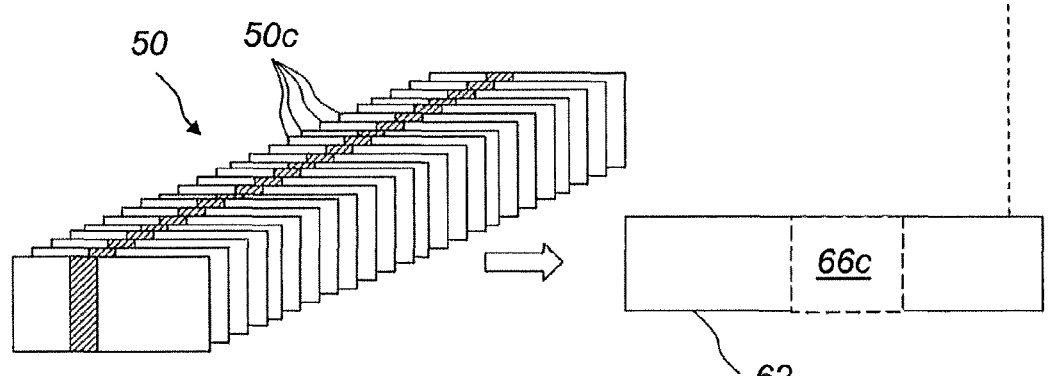

In FIGS. 9a-c the amount of overlap between all pairs of adjacent partial views is uniform. However, the inventive concept is not limited to such a configuration. Rather, there may be different overlap between different pairs of depicted adjacent views.

Figure 10:
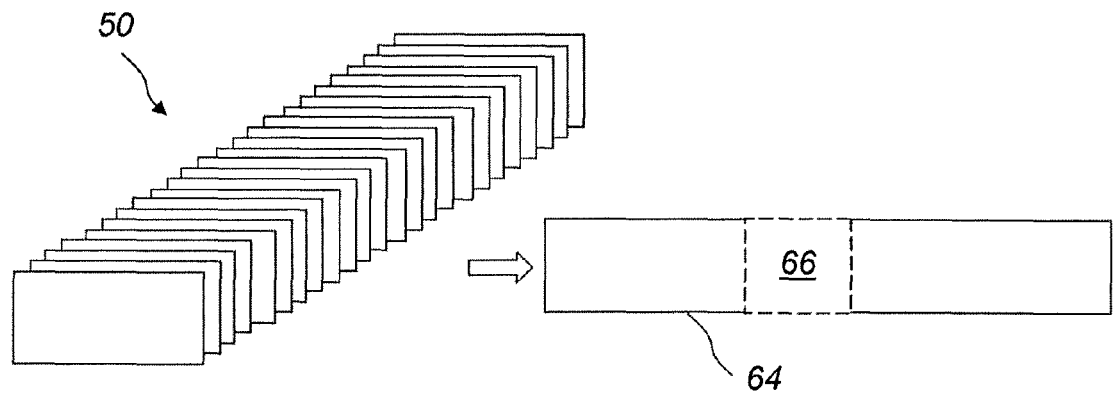

According to the method, a partial view of the complete continuous view is determined. The partial view may be determined, i.e. selected, by a user as illustrated in FIG. 10 wherein a combined image 64 depicting the complete continuous view may be formed by combining the captured images 50 (e.g. by stitching or blending). A miniature version (e.g. a thumbnail) of the combined image 64 may be displayed on the display of the camera 1. A user interface allowing the user to select a portion of the combined image 64 may further be presented on the display. The user may select a portion 66 of the combined image through the user interface. The dimensions of the portion 66 may e.g. be such that they match the resolution of the display of the camera 1. The camera 1 may then determine the partial view as the partial view depicted by the user selected portion 66. Alternatively, the portion 66 and consequently the partial view may be determined automatically by the camera 1. For example, the camera 1 may select a central portion of the combined image 64.

Once the partial view has been determined (or before the partial view is determined), a first combined image 58 may be formed by combining a first image part of each of the captured images 50 as illustrated in FIG. 9a. In FIG. 9a, the first image part of each captured image is indicated by the shaded area. The relative position of a first image part within an image may be the same for all captured images 50. In FIG. 9a, a first image part of an image corresponds to a leftmost image part. The first image parts may be combined in the same manner as in the first and second embodiments of the first aspect. The thus formed first combined image 58 depicts a first continuous portion of the complete continuous view.

In the same manner, a second combined image 60 may be formed by combining a second image part (the shaded parts of the images 50) of each of the captured images 50 as shown in FIG. 9b. The second image part of each image corresponds to another part of the image than the first image part. As a result, the second combined image 60 may depict a view slightly to the right of the view depicted in the first combined image 58. This is illustrated by the horizontal offset between the first and second combined images 58, 60 in FIGS. 9a and 9b.

Further, a third combined image 62 may be formed by combining a third image part (the shaded parts of the images 50) of each of the captured images 50 as shown in FIG. 9c. The third image part of each image corresponds to another part of the image than the first and second image parts. As a result, the third combined image 62 may depict a view slightly to the right of the view depicted in the second combined image 60. This is illustrated by the horizontal offset between the second and third combined images 60, 62 in FIGS. 9b and 9c.

The process of above may be repeated for further image parts wherein a plurality of such combined images may be formed, each depicting a continuous portion of the complete continuous view.

As indicated in FIGS. 9a-c, each combined image 58, 60, 62 includes a portion which corresponds to the image portion 66. In the combined image 58, the portion 66a corresponding to portion 66 is formed using the first image parts of a first set of images 50a. In the combined image 60, the portion 66b corresponding to portion 66 is formed using the second image parts of a second set of images 50b. In the combined image 62, the portion 66c corresponding to portion 66 is formed using the third image parts of a third set of images 50c.

As indicated in FIGS. 9a-c, the first set of images 50a includes an image which is not included in the second set of images 50b. The first set of images 50a includes two images which are not included in the third set of images 50c. The second set of images 50b includes an image which is not included in third set of images 50c. The second set of images includes an image which is not included in the first set of images 50a. The third set of images 50c includes an image which is not included in the second set of images 50b. The third set of images 50c includes two images which are not included in the first set of images 50a. The first, second and third sets of images 50a, 50b, 50c thus include images captured at different camera positions.

Accordingly, the portion 66a may depict a representation of the determined partial view as viewed from a first position. The portion 66b may depict a representation of the partial view as viewed from a second position. The portion 66c may depict a representation of the partial view as viewed from a third position, the first, second and third positions being different positions.

The representation depicted in each of the portions 66a, 66b, 66c may thus all include the same objects and features as the partial view, however as seen from different positions and hence along different line of sights.

These portions 66a, 66b, 66c (along with the corresponding portions of further combined images) may be identified using appropriate image analysis (e.g. by correlating the portion 66 with the combined images 58, 60, 62).

According to the method, the portions 66a, 66b, 66c (and portions of further combined images) may be provided as an image sequence. For example, the image sequence may be presented on the display of the camera 1 to a user by displaying the portions 66a, 66b, 66c in succession. The user may thus perceive the displaying of the image sequence as a smooth succession of images displaying the determined partial view as viewed from different directions. In the succession, depicted objects at different distances from the camera may be translated at different rates and thus add a sense of depth the image sequence. The image sequence may also be stored as a movie or a slide show enabling later convenient play back of the sequence.

Alternatively, the method may comprise displaying the portion 66b on the screen of the camera 1. In response to receiving a first user input the method may proceed with displaying either the portion 66a (which first user input would correspond to a "look more from the right" command) or the portion 66c (which would correspond to a "look more from the left" command). This enables a user to "explore" the determined partial view.

In FIGS. 9a-c, the dimensions of the first, second and third image parts have been exaggerated in order to simplify understanding of the method. In practice, it may be advantageous to use smaller or less wide image parts. Each image part may for example present a width of 10% of the full width of the image.

The first and second image parts of an image may be disjoint and border to each other. Similarly the second and third image parts of an image may be disjoint and border to each other.

To reduce the risk of incorrectly combining the image parts, or the risk of combining the first image parts, the second image parts and the third image parts differently, the combined images may be formed such that the representation of the partial view by the first combined image corresponds to the representation of the partial view by the second combined image. The third combined image may further be combined such that the representation of the partial view by the third combined image corresponds to the representation of the partial view by the first and the second combined image. This may be achieved by using any one of the alignment techniques described in connection with the first embodiment of the first aspect. Since the method may involve forming of a plurality of combined images, it may be advantageous to use the following alignment technique:

First, the first combined image 58 is formed in the above-described manner. Once the first combined image 58 has been formed it may be used for determining how the second image parts may be combined to form the second combined image 60. A second image part may be compared (e.g. using prior art image analysis techniques) to the first combined image 60 in order to identify features (e.g. edges, objects etc.) common to this second image part and the first combined image 58. This process may be repeated for further second image parts. The distance (e.g. in pixels) between the identified features in the first combined image 58 may be used as alignment data for forming the second combined image 60. More specifically, the second image parts may be combined (e.g. blended together or stitched) to form the second combined image 60 such that the distance between the identified features in the second combined image 60 corresponds to the distance between the corresponding features in the first combined image 58. This process may be repeated for forming the third combined image 62 wherein (at least some of) the third image parts may be compared to the first combined image 60 in order to determine alignment data which may be used for forming the third combined image 62.

An entire set of combined images may be generated prior to being presented to the user wherein appropriate portions (e.g. 66a, 66b, 66c) of the combined images may be used for forming image sequences. According to a second and alternative embodiment, images may be generated "on-the-fly". This will be described with reference to FIG. 11.

A plurality of images 70 are captured by the digital camera 1. The plurality of images 70 are similar to the images 50 described in connection with the first embodiment of the second aspect in that they may be captured from different positions of the camera 1, wherein there is an overlap between views depicted in pairs of consecutively captured images. In other words, there is an overlap between adjacent depicted views. The depicted views thus together define a complete continuous view.

In FIG. 11 the images 70 are illustrated horizontally offset with respect to each other. The horizontal offset corresponds to the relation and the overlap between the partial views depicted by the images 70. The images 70 are also illustrated slightly vertically offset with respect to each other. However, this offset is present only for visualization purposes for simplifying understanding of the method.

According to the method, a combined image 76 is formed as illustrated in FIG. 11c. The combined image 76 may depict a representation of a determined partial view of the complete continuous view. Determination of the partial view was described in connection with the first embodiment of the second aspect and will thus not be repeated here. The combined image 76 thus depicts a representation of the partial view as viewed from a first position. The combined image 76 is formed from the three image parts of images 70c, 70d and 70e. The combined image 76 is presented to the user on the display of the camera 1.

By using the input means of the camera 1, the user may either issue a "look more from the left" command or "look more from the right" command, hereinafter referred to as "left command" and "right command", respectively.

In response to receiving a "right command", the camera 1 forms the combined image 74 as illustrated in FIG. 11b. The combined image 74 is formed from the three image parts of images 70b, 70c and 70d. The combined image 74 may thus depict a representation of the partial view as viewed from a second position, some distance to the right of first position.

In response to receiving a further "right command", a combined image 72 may be formed as illustrated in FIG. 11a. The combined image 72 is formed from the three image parts of images 70a, 70b and 70c. The combined image 72 may thus depict a representation of the partial view as viewed from a third position, some distance to the right of second position.

If on the other hand, while displaying the combined image 76, a "left command" is received, a combined image 78 may be formed as illustrated in FIG. 11d. The combined image 78 is formed from the three image parts of images 70e, 70f and 70g. The combined image 78 may thus depict a representation of the partial view as viewed from a fourth position, some distance to the left of the first position.

In response to receiving a further "left command", a combined image 80 may be formed from the three image parts of images 70f, 70g, 70h. The combined image 80 may thus depict a representation of the partial view as viewed from a fifth position, some distance to the left of the fourth position.

The above-described process may be repeated for forming further combined images depicting the partial view from further positions in a corresponding manner.

The image parts used in the above-described method may be retrieved from the full captured images. Alternatively, each captured image may be partitioned into a number of image parts of a given width. The image parts may be saved as separate image files which may be used later for forming the combined images 72, . . . , 80. The alignment techniques described above may be used during forming of the combined images 72, . . . , 80.

In the above, the method aspects have been disclosed in connection with a digital camera. However, the inventive concept is not limited in this respect. For example, images of a plurality of consecutive views, wherein there is an overlap between views depicted in pairs of consecutive images, may be provided. The images may e.g. have been previously captured by a digital camera and downloaded to a computer running a computer program which may be configured to process the images in order to form e.g. three-dimensional image objects as discussed in relation to the first aspect and/or image sequences as discussed in relation to the second aspect.

According to a further aspect the digital camera 1 may implement both of the two above-described aspects. A user of the digital camera may thus pan the camera across a view wherein combined images may be formed which may be used for presenting/forming a three-dimensional image in accordance with the first aspect. In addition, the captured images may be used for forming combined images for sequential displaying in accordance with the second aspect. This may be complemented with saving a video sequence of the panning movement. Thus, three different types of image content may be created based images captured during a single pan of the camera.

A further aspect of the inventive concept will now be described with reference to FIG. 12. In accordance with the third aspect, there is provided a method for forming a combined image 88. A plurality of images 82 is provided. The images 82 may e.g. be captured by the digital camera 1 described with reference to FIG. 1. Alternatively, the images 82 may be previously captured images which are downloaded on a computer for forming of a combined image.

The images 82 depict respective partial views, wherein there is an overlap between partial views depicted in pairs of consecutively captured images. In other words, there is an overlap between adjacent partial views.

Figure 12:
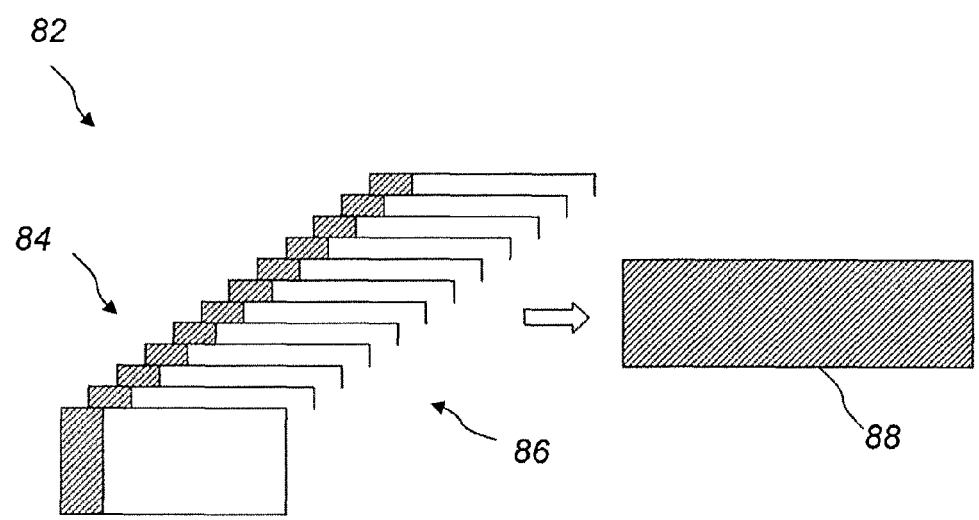
FIG. 12 illustrates a method according to an embodiment of a third aspect.

In FIG. 12 the images 82 are illustrated horizontally offset with respect to each other. The horizontal offset corresponds to the overlap between the partial views depicted by the images 82. The images 82 are also illustrated slightly vertically offset with respect to each other. However, this offset is present only for visualization purposes for simplifying understanding of the method.

Each one of the images 82 includes a first image part 84 (the shaded parts) and a second image part 86 (the unfilled parts). In FIG. 12, the first image part 84 corresponds to a left part of the image. However, the first image parts may correspond to some other part of the images, e.g. a right part, a central part etc. Moreover, the width of the first image part 84 in relation to the image may be larger or smaller than that illustrated in FIG. 12.

According to the method, a combined image 88 is formed from the first image parts 84. The overlaps between the depicted partial views are such that the combined image 88 depicts a continuous view. According to the method, the second image parts 86 are disregarded during the forming of the combined image 88. The first image parts 84 may e.g. be extracted or retrieved from the captured images 82 and then combined to form the combined image 88 wherein the second image parts 86 are disregarded. Alternatively, the second image parts 86 may be discarded prior to forming the combined image 88. The images 82 may e.g. be cropped such that only the first image parts 84 remain. The combined image 88 may then be formed by combining the first image parts 84.

By only using a part of each image 82, the amount of image data that needs to be processed during forming of the combined image 88 may be greatly reduced. The method of this aspect thus provides a computationally efficient way of forming combined images. The advantages of the method are especially pronounced when the number of images 82 is great.

The method may be implemented and performed in its entirety on the camera 1. Alternatively, only the capturing of the images 82 and the discarding of the second image parts 86 may be performed in the camera 1. The forming of the combined image 88 may e.g. be performed on a computer once the first image parts 84 have been downloaded thereto.

Each one of the images 82 may be provided in a compressed format comprising a stream of variable length encoded code words (e.g. Huffman encoded code words), which stream represents sequential image blocks. Indicators to at least some of the code words may be generated, wherein the indicators indicate the position of at least a DC coefficient of at least a subset of the image blocks. The cropping and the forming of the combined image may be performed using the indicators. A detailed discussion of the indicators and how extraction of image parts may be carried out was provided in connection with the discussion of the first embodiment of the first aspect wherefore reference is being made to the previous discussion.

In the above, the invention has mainly been described with reference to a limited number of examples. However, as is readily appreciated by a person skilled in the art, other examples than the ones disclosed above are equally possible within the scope of the invention, as defined by the appended patent claims.

The invention claimed is:

1. A method for forming images, comprising:
providing a plurality of images, each image depicting a respective view, wherein there is an overlap between views depicted in pairs of images and wherein the respective depicted views together define a continuous view;
dividing each image of said plurality of images into at least a first image part of said image and a second image part of said image;
forming, from the plurality of first image parts of said plurality of images, a first combined image representing a first partial view of said continuous view;
forming, from the plurality of second image parts of said plurality of images, a second combined image representing a second partial view of said continuous view;
at a first time, displaying only the first combined image and no part of the second combined image; and
at a second time, different to the first time, displaying only the second combined image and no part of the first combined image.

2. A method according to claim 1,
wherein the first combined image is formed from a first image part of each image of a first subset of said images and represents said first partial view and
wherein the second combined image is formed from a second image part of each image of a second subset of said images and represents said second partial view.

3. A method according to claim 2, wherein the first subset of images includes at least one image which is not included in the second set of images.

4. A method according to claim 3, wherein the first set of images and the second set of images includes at least one common image.

5. A method according to claim 2, further comprising forming, from a third image part of each image of a third subset of said images, a third combined image representing a partial view of said continuous view.

6. A method according to claim 5, further comprising providing an image sequence including said combined images.

7. A method according to claim 1, further comprising:
forming the first combined image and the second combined image such that the representation of said partial view by the first combined image corresponds to the representation of said partial view by the second combined image.

8. A method according to claim 1, further comprising:
in response to forming the first combined image, determining alignment data for the second image parts by analyzing a relation between at least a subset of said second image parts and the first combined image, and
forming the second combined image by combining the second image parts based on said alignment data.

9. A method according to claim 1, further comprising:
forming a fourth combined image from the provided images prior to forming the first and the second combined image, determining first alignment data for the first image parts by analyzing a relation between at least a subset of the first image parts and the fourth combined image, determining second alignment data for the second image parts by analyzing a relation between at least a subset of the second image parts and the fourth combined image, forming the first combined image by combining the first image parts based on the first alignment data, and forming the second combined image by combining the second image parts based on the second alignment data.

10. A method according to claim 1, further comprising:

determining alignment data for a pair of the first image parts, the pair depicting a pair of adjacent view portions, by analyzing a second image part of the provided images, which second image part depicts a view portion partly overlapping said pair of adjacent view portions forming the first combined image by combining the first image parts based on said alignment data, and forming the second combined image by combining the second image parts based on said alignment data.

11. A method according to claim 2, wherein the first and second partial views are automatically determined.

12. A method according to claim 1, wherein the first partial view of the continuous view and the second partial view of the continuous view include the same objects and features as seen along different lines of sight.

13. A method as claimed in claim 1, wherein the first combined image only and no part of the second combined image is displayed in response to a first user command and the second combined image only and no part of the second combined image is displayed in response to a second user command.

14. A method according to claim 13, wherein the first user command is a 'look more from the right' command and the second user command is a 'look more from the left' command.

15. A method as claimed in claim 1, wherein the plurality of images are all captured using a single camera.

16. A method according to claim 15, wherein said provided images are automatically captured from different positions during a camera pan.

17. A method according to claim 15, further comprising tracking the direction and position of the camera.

18. A method as claimed in claim 1, wherein a position of the first image part relative to a position of the second image part within each of the plurality of said images is the same.

19. An apparatus comprising:

at least one processor; and at least one memory including computer program code the at least one memory and the computer program code configured to, with the at least one processor, cause the apparatus at least to perform:

providing a plurality of images, each image depicting a respective view, wherein there is an overlap between views depicted in pairs of consecutive images and wherein the respective depicted views together define a continuous view;

dividing each image of said plurality of images into at least a first image part of said image and a second image part of said image;

forming, from the plurality of first image parts of said plurality of images, a first combined image representing a first partial view of said continuous view;

forming, from the plurality of second image parts of said plurality of images, a second combined image representing a partial view of said continuous view;

at a first time, displaying only the first combined image and no part of the second combined image; and at a second time, displaying only the second combined image and no part of the first combined image.

20. An apparatus according to claim 19, wherein the first combined image is formed from a first image part of each image of a first subset of said images and represents said first partial view and wherein the second combined image is formed from a second image part of each image of a second subset of said images and represents said second partial view.

21. An apparatus according to claim 19, wherein the first partial view of the continuous view and the second partial view of the continuous view include the same objects and features as seen along different lines of sight.

22. An apparatus according to claim 19 configured as a mobile phone and comprising an image sensor and a display.

* * * * *